United States Patent
Chadha et al.

(10) Patent No.: US 10,397,236 B1
(45) Date of Patent: Aug. 27, 2019

(54) ANAMOLY DETECTION AND RECOVERY OF A CORRUPTED COMPUTING RESOURCE

(71) Applicant: Amazon Technologies, Inc., Seattle, WA (US)

(72) Inventors: Kunal Chadha, Seattle, WA (US); Zaher Dannawi, Seattle, WA (US); Bharath Mukkati Prakash, Bellevue, WA (US); Hardik Nagda, Seattle, WA (US); Anirudh Mattur Radhakrishna, Seattle, WA (US); Ashish Rangole, Seattle, WA (US); Chenxi Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 15/376,335

(22) Filed: Dec. 12, 2016

(51) Int. Cl.
*H04L 29/06* (2006.01)
*G06F 11/30* (2006.01)
*G06F 11/34* (2006.01)

(52) U.S. Cl.
CPC ........ *H04L 63/102* (2013.01); *G06F 11/3006* (2013.01); *G06F 11/3476* (2013.01); *G06F 11/3495* (2013.01); *H04L 63/1441* (2013.01); *G06F 2221/2111* (2013.01)

(58) Field of Classification Search
CPC ............... H04L 63/102; H04L 63/1441; G06F 11/3006; G06F 11/3476; G06F 11/3495; G06F 2221/2111
See application file for complete search history.

(56) References Cited

U.S. PATENT DOCUMENTS

| | | | | |
|---|---|---|---|---|
| 8,631,472 | B1* | 1/2014 | Martin | H04L 63/08 726/4 |
| 9,426,139 | B1* | 8/2016 | McClintock | H04L 63/08 |
| 10,019,362 | B1* | 7/2018 | Chatterjee | G06F 3/0619 |
| 10,057,227 | B1* | 8/2018 | Hess | H04L 63/08 |
| 2004/0088260 | A1* | 5/2004 | Foster | G06Q 20/382 705/64 |
| 2005/0257266 | A1* | 11/2005 | Cook | G06F 8/61 726/23 |
| 2006/0294388 | A1* | 12/2006 | Abraham | G06F 21/305 713/182 |
| 2008/0184342 | A1* | 7/2008 | Carroll | H04L 63/102 726/4 |

(Continued)

*Primary Examiner* — Yonas A Bayou
(74) *Attorney, Agent, or Firm* — Klarquist Sparkman, LLP

(57) ABSTRACT

A customer's resources are protected from malicious or accidental deletion or termination. In some embodiments anomaly detection is used for identifying suspicious activities, which is combined with options to restore previously deleted resources. To define and detect anomalies, resource profiles are generated indicative of how resources are being used, and user profiles of how users use resources of the compute service provider. Instead of immediately deleting a resource, a temporary marker can be placed on the resource. The temporary marker blocks attempts to access the resource just as if the resource was deleted. However, the resource can easily be recovered by simply removing the marker. When a deletion event is identified as anomalous, an alert is generated to the customer. Upon receiving the alert, customers can opt to restore the resource that has been deleted, which will remove the marker.

19 Claims, 9 Drawing Sheets

(56) References Cited

U.S. PATENT DOCUMENTS

| | | | |
|---|---|---|---|
| 2009/0044020 A1* | 2/2009 | Laidlaw | H04L 63/08 |
| | | | 713/176 |
| 2011/0099602 A1* | 4/2011 | Apparao | G06Q 10/06 |
| | | | 726/1 |
| 2014/0325223 A1* | 10/2014 | Turgeman | H04L 63/1408 |
| | | | 713/168 |
| 2015/0156171 A1* | 6/2015 | Biswas | H04L 63/04 |
| | | | 726/26 |
| 2016/0105290 A1* | 4/2016 | Khalil | H04L 9/3271 |
| | | | 713/176 |

* cited by examiner

ANAMOLY DETECTION AND RECOVERY OF A CORRUPTED COMPUTING RESOURCE

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Compute Service Providers that offer cloud computing to customers have security measures in place to prevent cyber-attacks on the customer's data or computing resources. In some cases, a cyber-attack can delete a customer's data or terminate the customer's resources by hacking into the customer's environment. Once the customer data or computing resources are deleted, they can be difficult to recover.

DETAILED DESCRIPTION

Figure 1:
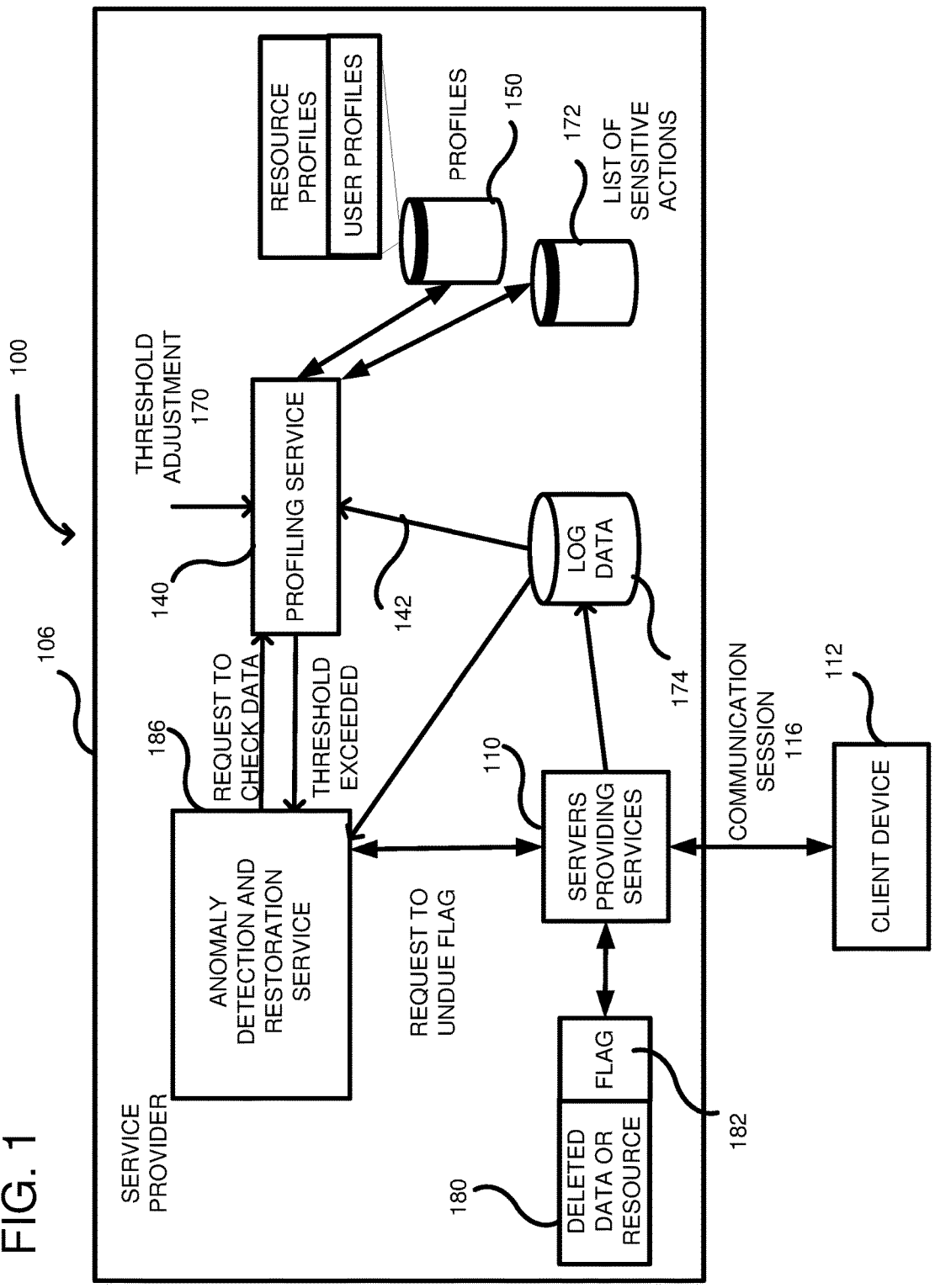
FIG. 1 is a system diagram of a service provider that detects corruption of a resource based on metrics from previous user communication sessions.

In the embodiments described herein, in a compute service provider environment, a customer's resources are protected from malicious or accidental deletion or termination. In some embodiments anomaly detection is used for identifying suspicious activities, which is combined with options to restore previously deleted resources. These resources can include, for example, a logical unit of storage in an object storage service, a compute instance, a virtual machine, database resources, user profiles, keys, access control policies, programs, files, data, etc. For example, a service can detect that a resource was recently created and has actively been used and that the resource was suddenly deleted. The resource can be represented, for example, by data associated with the resource in a customer account. Such a situation can be detected as an anomaly and an alert can be generated to the customer. Another example is where a user has rarely or never accessed a resource before and wants to delete the resource. Such a situation can be considered anomalous and an alert to the customer can be generated. To define and detect anomalies, resource profiles are generated indicative of how resources are being used and user profiles are generated indicative of how users use resources of the compute service provider.

Instead of immediately deleting a resource, a temporary marker can be placed on the resource. The temporary marker blocks attempts to access the resource just as if the resource was deleted. However, the resource can easily be recovered by simply removing the marker. The marker, however, is not a true deletion because the resource is not released for reuse. When a deletion event is identified as anomalous, an alert is generated to the customer (e.g., alerts can be in a variety of forms including an email, SMS, etc.). The alert can also indicate specifics of the suspicious activity. Upon receiving the alert, customers can opt to restore the resource that has been deleted or otherwise terminated, which will initiate the removal of the marker.

In some aspects the anomaly detection is accomplished using resource and user behavior profiles. The suspicious activity is detected after the actual deletion or termination operation has occurred. Thus, the deletion or termination event appears completed through a temporary marker flag, and after a period of time, a detection is made of whether this activity is suspicious. Customers are then provided with an easy mechanism to restore the resource to its pre-deletion state.

User behavioral metrics relate to user behavior or how a user typically acts when interacting with the service provider, such as the user's geographic location, the user's IP address, the time of day that a user typically interacts with a compute service provider, APIs typically used by the user, services typically used by the user, etc. Other behavioral events may be associated with a time stamp or time window, as they may be regularly occurring events associated with the user identity, such as how frequently the user deletes data. Such user behavior can be obtained from log data at any point after a user session. Other user behavior metrics can be based on real-time data associated with a user session. Examples of real-time behavioral events may include typing frequency, typing cadence, key-press duration, frequency of scrollbar use, and/or other behavioral characteristics that may be consistent for a user. Resource behavior relates to how resources of a service provider are used by multiple users. For example, the resource behavior can be associated with typical locations of users, typical patterns for using the resource (e.g., how often data is deleted), typical numbers of people accessing the resource, typical APIs received by the resource, etc. Another behavioral event can be based on whether a large batch of requests are received over a short period of time. Such a large batch of requests can indicate anomalous behavior.

FIG. 1 shows an overall system 100 for detecting corruption of a resource. The resource can be related to data storage, data (such as a data block), a virtual machine instance, or other resources available from a compute service provider. The corruption can relate to deletion of the resource, such as when data is deleted or termination of the resource, such as when an instance is terminated. Other types of corruption of resources are also contemplated, such as a modification of the resource. In any case, the corruption of the resource results in the customer not being able to fully access the resource. The corruption can be accidental or intentional, for example, because of malicious activity or hacking.

A service provider 106 offers a variety of services 110, for which a client device 112 can interact. Typically, the client device 112 makes Application Programming Interface (API) calls to the service provider 106. Various metrics for an active communication session 116 are captured and stored in a log data database 174, and such metrics can be passed to a profiling service 140 as shown at 142. The profiling service 140 can use the metrics to generate profiles associated with the user of the client device or resources of the service provider 106. The profiles describe typical characteristics or preferences of the user of the client device 112, such as behavioral preferences of the user, or services provided to the client device by a compute service provider. As further described below, the metrics can be saved in association with time stamps. Additionally, the metrics can be scaled so that different metrics can be viewed on a same graph. Once generated, the user and resource profiles can be stored with other profiles in storage 150. In a typical communication session, the profiling service 140 has a customer identifier and uses that identifier to obtain a user profile from the storage 150. The retrieved user profile can then be supplemented using the session metrics and then restored in the storage 150 for future use. The stored user and resource profiles 150 can include resource behavior (e.g., actions that the resources took on behalf of users), user behavior (geographic location of the client device 112), etc. The profiling service 140 can also use other metric data, such as historical performance data associated with the user, historical data associated with past user communication sessions, or historical user behavior, to build a user profile. The profiling service 140 can further use machine learning to establish thresholds. Using the session metrics 142 together with the stored user profile 150, the profiling service 140 can generate or supplement a user profile. Additionally, thresholds can be set using an input policy 170 or other predetermined parameters. The policy 170 can be controlled by an administrator of the service provider 106 or a customer. The profiling service 140 can also retrieve a list of sensitive actions from a storage 172. The list of sensitive actions can be used to alert a service that marking may be needed to allow a user to undue an action. Example sensitive actions include deleting data or instances. The list of sensitive actions can be modifiable by a system administrator or an end user, such as a user of the client device 112.

The sensitive actions and thresholds can be machine learned (e.g., machine-learning may include clustering algorithms, combining multiple learning algorithms, dimensionality reduction algorithms, regression analysis, etc.). The data gathered from the specific customer, general customers, and external sources and/or the data stored in the profile store 150 may be used as inputs in a machine learning algorithm or concept in order to best model or determine specific actions/thresholds. Different machine learning concepts may be applied to the user behavior data or resource behavior. For example, when behavior data is being used on a user-specific statistical model, the machine learning concepts to be implemented may be a regression model, a simple linear logistic model, or a logistic regression model, which may model the likelihood that the action should be marked a sensitive action or a threshold should be set to a specific level. In example embodiments, more complex machine learning concepts, such as neural networks, Naive Bayes classifiers, random forests, or ensemble learning methods may be used when applying profile data to the model. For example, when large amounts of user behavior data exists, such as multiple inputs from multiple customers, neural networks or more robust machine learning algorithms may be employed in order to train or teach the statistical model based on a larger amount of user/customer behaviors. The machine learning can be based on a feedback loop wherein customer responses to the alerts are taken into consideration in future alerts. For example, if multiple alerts are generated for a particular scenario and the customer's actions indicate that the anomalous event is acceptable, future alerts can be suppressed.

When services 110 perform actions on behalf of the client device 112, servers associated with the services store log data in a database 174. Such log data can be accumulated over a period of time so as to gather event data associated with actions performed by the services 110. One such event is shown as an example at 180, wherein a service 110 was requested to delete a portion of data, which can represent a resource. The data or resource can be, for example, a logical unit of storage in an object storage service, a compute instance, a virtual machine, database resources, user profiles, keys, access control policies, security-based control parameters, software programs, data files, etc. The data or resource 180 can be accessible through a storage service (not shown) and the deletion of the data or resource 180 can be the result of an API request from a service 110 to the storage service. When a deletion event occurs, a marker, such as a flag (e.g., one or more bits 182), can be set so as to indicate that the data or resource is in an intermediate state waiting to be deleted. An anomaly detection and restoration service 186 can periodically retrieve the log data 174 and parse the log data for events that were performed by the services 110. The anomaly detection and restoration service 186 can search for specific events such as the deletion event 180. When such an event is detected, the anomaly detection and restoration service can transmit a request to check such an event with the profiling service 140 to ensure that the event is within profiled limits. In response, the profiling service 140 can determine whether metrics associated with the event exceed a threshold associated with the stored profiles 150. If the profiling service 140 indicates that the threshold was exceeded, an alert can be sent from the anomaly detection and restoration service to the client device or an administrator for the customer. The alerts can take a variety of forms, such as an email, SMS, phone call, etc. In some embodiments, to prevent excessive notifications, the profiling service 140 can check whether a threshold is exceeded only for actions that are considered sensitive from the storage 172. If the customer acknowledges that the event was an anomaly, the anomaly detection and restoration service 186 can transmit a request to the service 110 that performed the deletion to undue the previous event. For example, the request to undue can result in the flag 182 being cleared. By clearing the marker or flag, the data or resource 180 is effectively un-deleted and available again for access by the client device 112. On the contrary, if the customer either confirms the event or otherwise does not respond within a predetermined period of time, the data or resource 180 can be permanently deleted. Permanent deletion can be accomplished using a file allocation table as described further below in relation to FIG. 4. Although the request to undue the flag is shown as a request from the service 186 to the servers 110, the service 186 can directly manipulate the flag 182 without passing a request through the servers 110.

Figure 2:
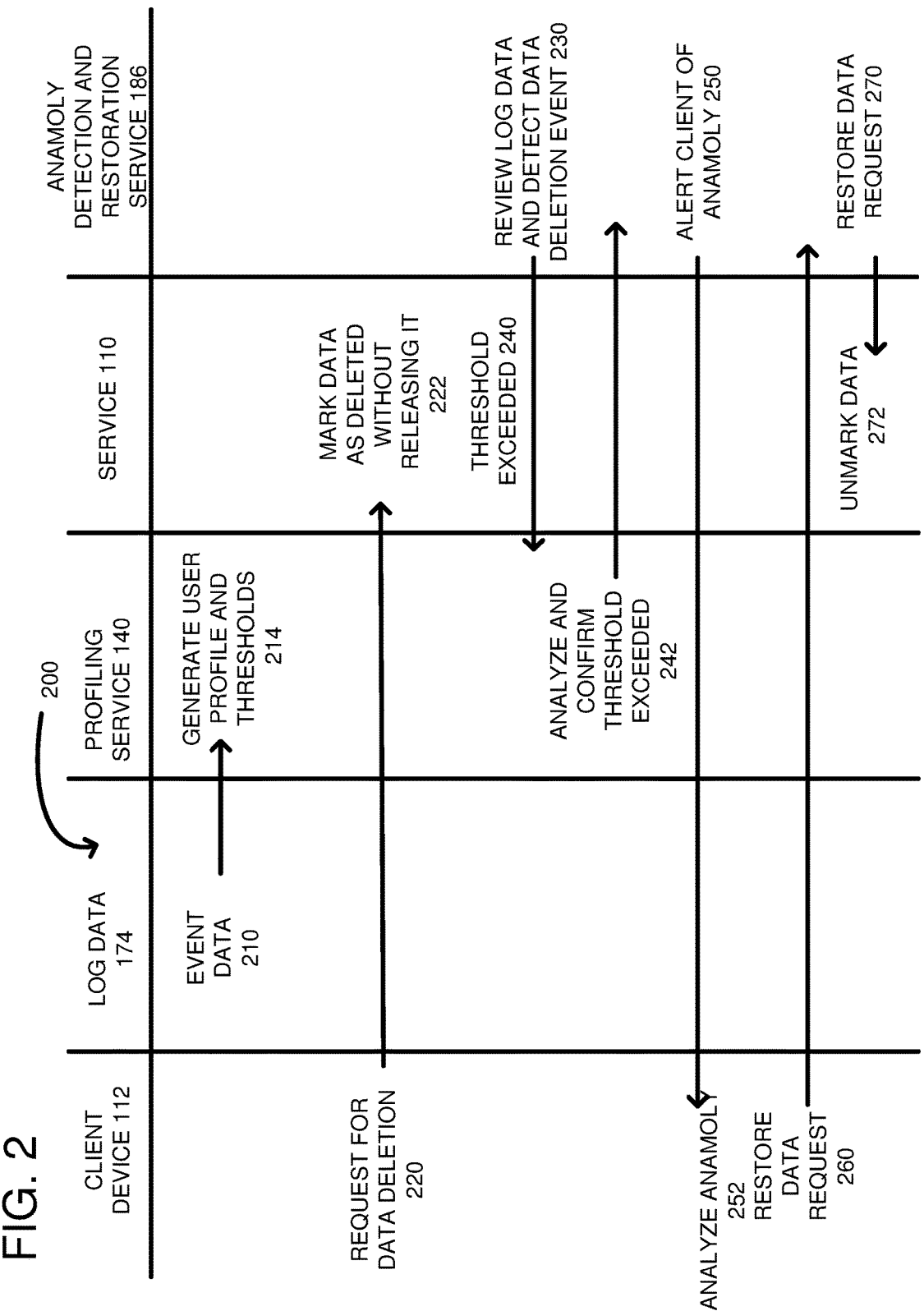
FIG. 2 shows a communication flow between components of FIG. 1 to perform corruption detection of a resource and correction thereof.

FIG. 2 is an embodiment showing communication flow 200 between the components of FIG. 1, including the client device 112, the services 110, the profiling service 140, and the anomaly detection and restoration service 186. At 210, event data is stored in the log data database 174. Typically, the event data is data that is acquired by the services 110 based on the communication session 116 and stored in the log data database 174. In some embodiments, active communication metrics can also be obtained. For example, a communication session is opened between the client device 112 and the service provider 106 and the client device transmits activity data to the service provider, such as click-stream data. The click-stream data is associated with a path that the user takes while browsing a Web site. Each distinct selection made on a Web page adds one click to the click stream. Metrics associated with the click stream can be captured using a monitoring service (not shown). The metrics can include a click speed, which is a maximum interval between the first and second time a user presses a button on a mouse or other pointing device, a time for a round-trip communication from the service provider to the client device and back, a rendering time associated with transmitting content from the service provider to the client and having the content rendered on the client device, environmental metrics, etc. Other metrics can include a geographic location of the client device 112 (e.g., city and state), an Internet address associated with the client device, etc. The event data 210 can also include actions requested, such as APIs that are transmitted or services 110 with which the client device 112 interacted. In the embodiments where a monitoring service is used, it can passively monitor communications between the client device 112 and the service 110 (such as by using a port mirror), or it can actively receive the network packets between the client device and the service and retransmit the packets. In either case, the monitoring service can access network packets in the communication session between the server 110 and the client device 112. The profiling service 140 can receive the captured metrics and generate user and resource profiles and thresholds 214 associated with those profiles. A single baseline profile can be generated for the user or different profiles can be associated with the different metrics. The activity data 210, which includes communications and actions, is stored as historical data for past communication sessions that have occurred or services 110 with which the client device 112 interacted.

A communication session starts at 220 wherein a request to delete data or a resource is made from the client device 112 to one of the services 110. For example, the client device 112 may request to delete a computing instance or an object store associated with a particular account. Although FIG. 2 relates to data or a resource, only data is illustrated and further discussed below for ease of illustration. Events, such as the request to delete, can be stored in the log data database 174. For example, packets associated with the communication session are stored in log data 174 and such packets can be stored by the services 110. The metric data can be analyzed by the profiling service 140 and stored in the user profiles 150. At 222, the service 110 can receive the request and mark the data as deleted using flag 182, but without releasing the data for use by others, so that it may be recovered if necessary. At 230, periodically, the anomaly detection and restoration service 186 reviews the log data 174 and parses the log data looking for particular events, such as delete events or terminate events. Other events can used depending on customer needs. When an event of interest is found, the anomaly detection and restoration service 186 can transmit a request to profiling service 140 whether a threshold has been exceeded, as shown at 240. In one example, the request 240 can include a time stamp and the profiling service 140 can examine whether the communication session associated with that timestamp had any thresholds exceeded. In one example, the profiling service 140 can determine that the communication session occurred outside of a typical geographic region and therefore the thresholds have been exceeded. Either resource profiles, user profiles or both can be used in determining whether the event exceeds a threshold. At 242, the profiling service 140 analyzes the event and confirms that for this particular event, a threshold has been exceeded. At 250, in response, the anomaly detection and restoration service 186 transmits an alert to the client device 112. The alert can be in a variety of forms including an email, on SMS message, or a telephone call. The alert can also be transmitted to an administrator of the customer associated with the client device 112. In any event, the customer can analyze the anomaly as shown at 252 and determine that the event was either malicious, accidental or intentional. In response, the customer can transmit a request to restore the deleted data as shown at 260 if the deletion was not intentional. At 270, the anomaly detection and restoration service 186 performs actions necessary to restore the deleted data to its previous state. For example the anomaly detection and restoration service 186 can send a request to clear the marking or flag 182 to the service 110 that performed the deletion. Alternatively, the anomaly detection and restoration service 186 can clear the flag itself, such as through a request to a storage service. In any event, the flag 182 is cleared as shown at 272 so that the data 180 is no longer deleted and is available for use by the client device 112.

Figure 3:
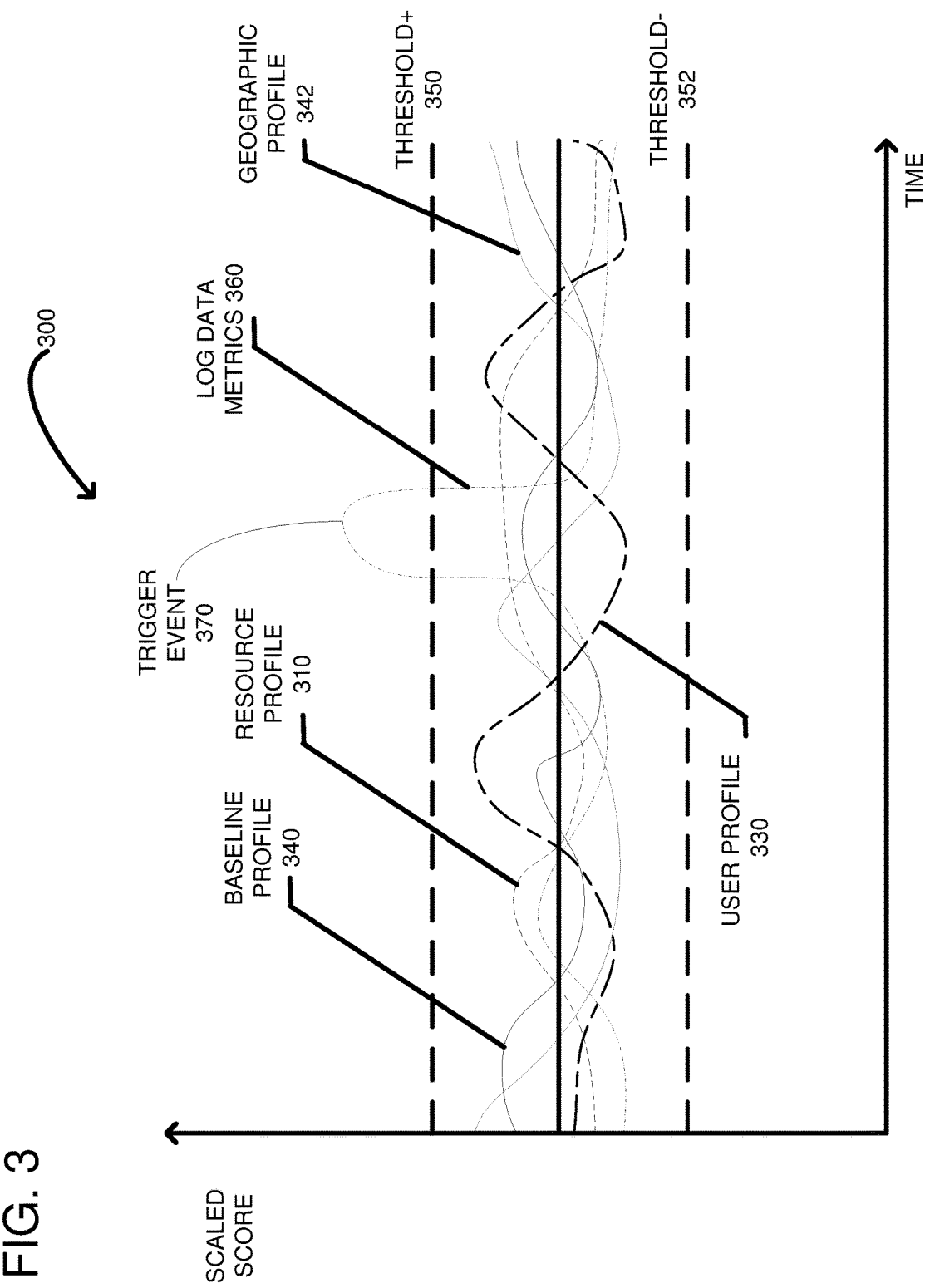
FIG. 3 shows potential profiles used to detect an anomalous condition in a communication session.

FIG. 3 is an illustrative graph 300 depicting profiles derived from communication session metrics or other data based on a scaled Y-axis and a time-based X-axis. The profiles can be used to determine when an anomalous event occurs. The profiles can be based on a plurality of different metrics, each generating a separate profile or a combination of metrics. For example, resource profile 310 can include resources or services that a customer uses. For example, services associated with a compute service provider can be associated with an identifier and that identifier can be used to establish a profile for the service. A user profile 330 relates to user behavior such as the time of day that the user typically makes requests, what services the user uses, IP address of the user, etc. The user profile can further include performance data of the client device or the network. Examples include speed-related metrics (rendering, packet transmission, etc.) associated with the network or the client device itself. A geographic profile 342 can relate to geographic regions associated with the customer. Such a profile can be merged with the user profile, or kept separate as indicated in FIG. 3. More specifically, client devices associated with a customer can be monitored to determine a geographic region from which requests are made to the compute service provider. One or more of these profiles can be combined to generate a baseline profile 340, if desired. A hysteresis function may be used to generate the baseline profile 340. For example, the baseline profile may comprise resource profile 310, geographic profile metric data 342, user profile data 330, as well as other metric data. The baseline profile 340 may be specific to a user, or may be based on information acquired from a plurality of users. Using one or more of the profiles, thresholds 350, 352 can be generated. For example, the thresholds can be generated by taking a mean or average of a profile and then calculating a percentage deviation from the mean or average. How the thresholds are calculated can be controlled through a policy document, such as is shown at 170 in FIG. 1. Although only two thresholds are shown, any number of thresholds can be used, such as a different threshold for each metric. Additionally, composite metrics can be used.

A log data session metric 360 is shown and represents metrics captured and stored in log data 174 during a communication session between the client device and the service provider. At a certain point in time, one or more of the metrics exceeds a threshold as indicated at 370, creating a trigger event. The trigger event can result in a response to the anomaly detection and restoration service 186 of an anomalous condition. The anomaly detection and restoration service 186 can then take corrective action, as described herein. The triggering event 370 can be a single event or a combination of multiple events.

Figure 4:
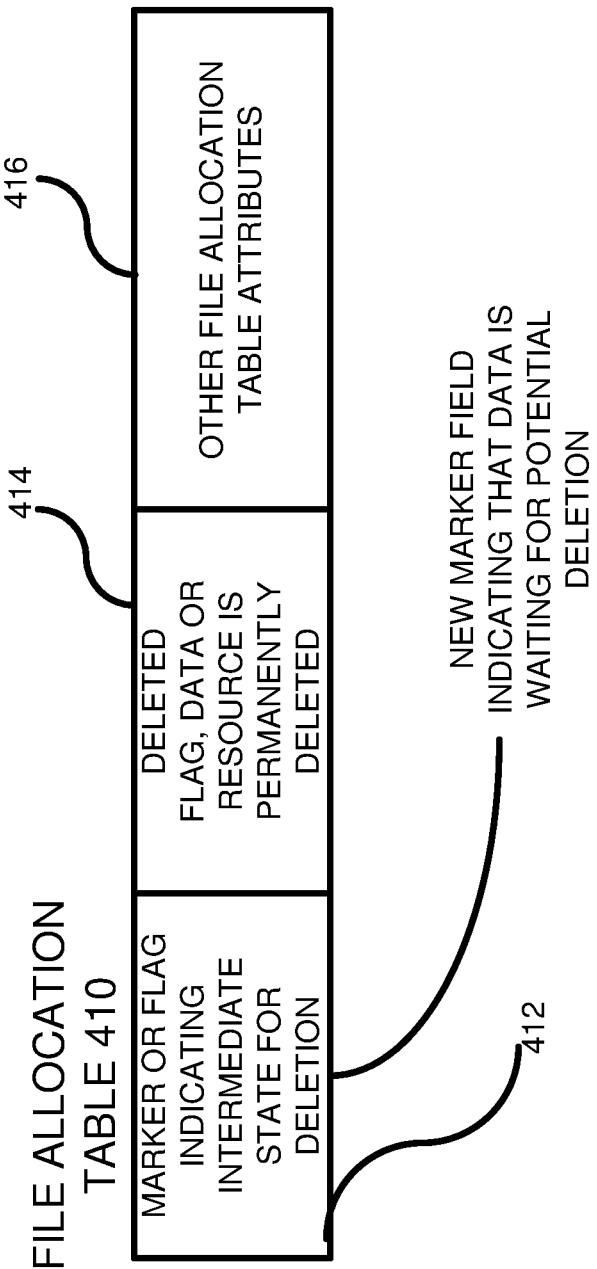
FIG. 4 shows an example file allocation table including multiple fields, such as a marker or flag, for marking an intermediate state of deletion for a resource.

FIG. 4 is an example wherein a file allocation table 410 is used to implement the flag 182 (FIG. 1). The example file allocation table 410 includes a marker or flag 412 indicating an intermediate state for deletion of associated data or a resource. When the marker is set, the associated data or resource is not available for use by customers of the compute service provider. As such, the data or resource is preserved in case the customer reconsiders the deletion. At 414, a flag is shown for deleting data or a resource so that the data or resource is permanently deleted and available for reuse by customers of the compute service provider. At 416, other file allocation table attributes are shown as are well understood by those skilled in the art. The marker or flag 412 is an addition to a typical file allocation table 410 in that the flag indicates inaccessibility of the data or resource without permanent deletion. Although this embodiment uses a file allocation table 410 to implement the flag 182, other implementations can be used such as providing flags within the server computers 110 providing the services of the compute service provider. Alternative locations for the flag's 182 can also be used. To permanently delete data or a resource, the marker 412 can be cleared and the flag 414 can be set.

Figure 5:
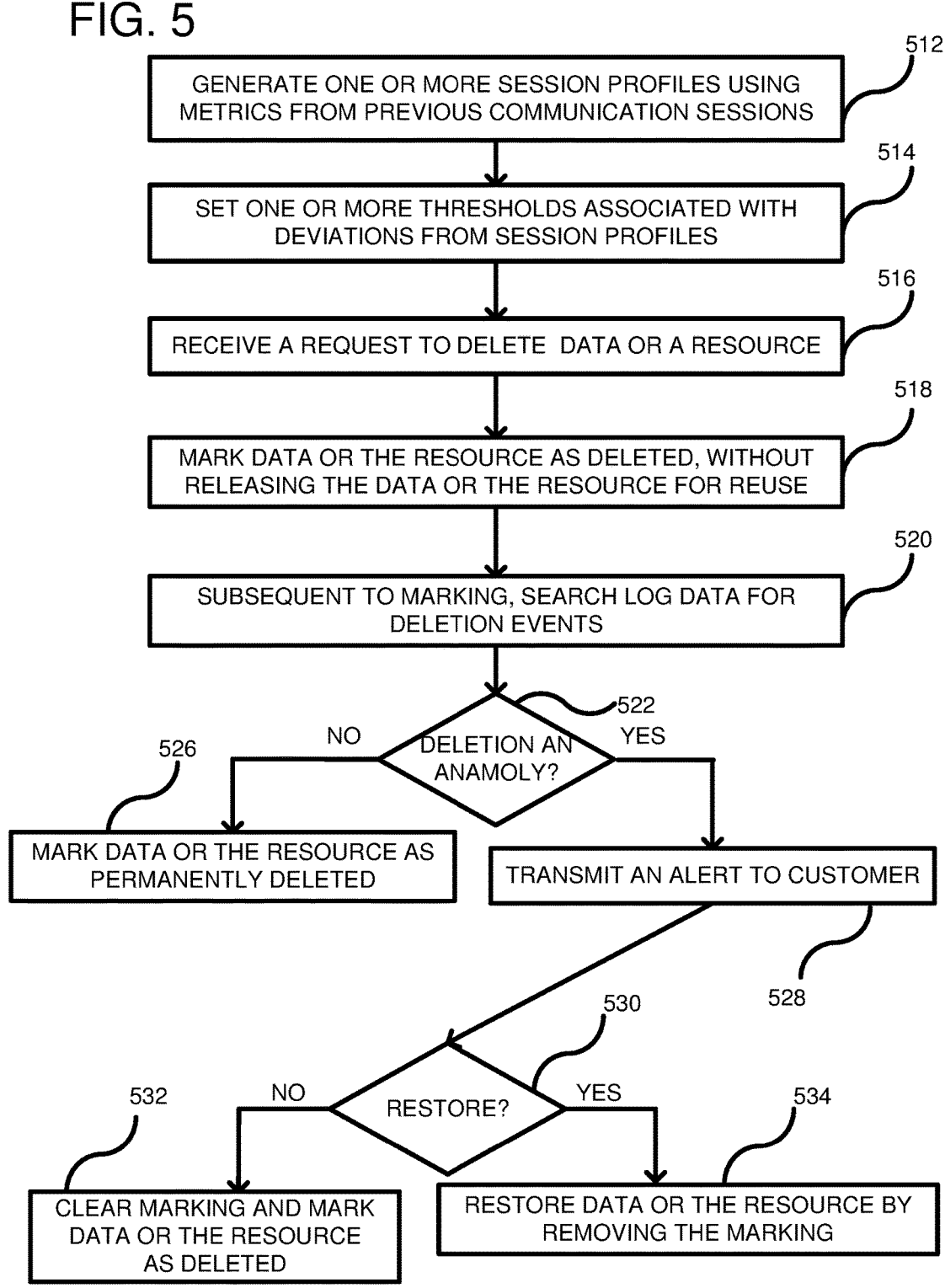
FIG. 5 shows a flowchart according to one embodiment for detecting corruption of a resource and taking corrective action.

FIG. 5 is a detailed flowchart according to one embodiment for detecting corruption of a resource in a compute service provider environment. At process block 512, one or more session profiles are generated using metrics from previous communication sessions. For example, as described above, various metrics, such as user locations, resource behavior, or user behavior can be used to generate user profiles associated with a customer and/or resource of the compute service provider. In process block 514, one or more thresholds can be set associated with deviations from the session profiles. For example, the deviations can represent a percentage change from an average of a baseline profile associated with the session profiles. At process block 516, a request is received from a client device to delete data or a resource. The request can be received by a service of the compute service provider. In response, at process block 518, the service marks the data or resource as deleted but without releasing the data or resource for reuse. For example, the service can set a flag, such as is shown at 182 in FIG. 1. The flag can be within a file allocation table or other locations as described above. At process block 520, subsequent to the marking, the anomaly detection and restoration service 186 can search log data for data or resource deletion events. In one example, data or resource deletion events can be associated with a particular API that is transmitted to a service and the search can be for that particular API. At decision block 522, a determination is made whether or not the deletion of the data or resource is an anomaly. As previously discussed, such a determination can be made through interactions between the anomaly detection and restoration service 186 and the profiling service 140. If there is no anomaly detected, then at process block 526, the flag 182 is cleared and the data or resource is marked as permanently deleted. In this case, the data or resource is available for reuse by other customers of the compute service provider. Such a permanent deletion can occur by setting flag 414 in the file allocation table. Alternatively, if decision block 522 is answered in the affirmative, then at process block 528, an alert is transmitted to the customer such as through an email, text message or other means. At decision block 530, the anomaly detection and restoration service receives a response from the customer whether or not to restore the deleted data or resource. If the customer determines not to restore the data or resource or if the customer does not respond, then the flag 182 is cleared and the data or resource is marked as deleted (process block 532). Alternatively, if decision block 530 is answered in the affirmative then at process block 534 the data or resource is restored by removing the flag 182 to return the data or resource to its previous state. The flag 414 was never changed during this process, so the data or resource was never truly deleted.

Figure 6:
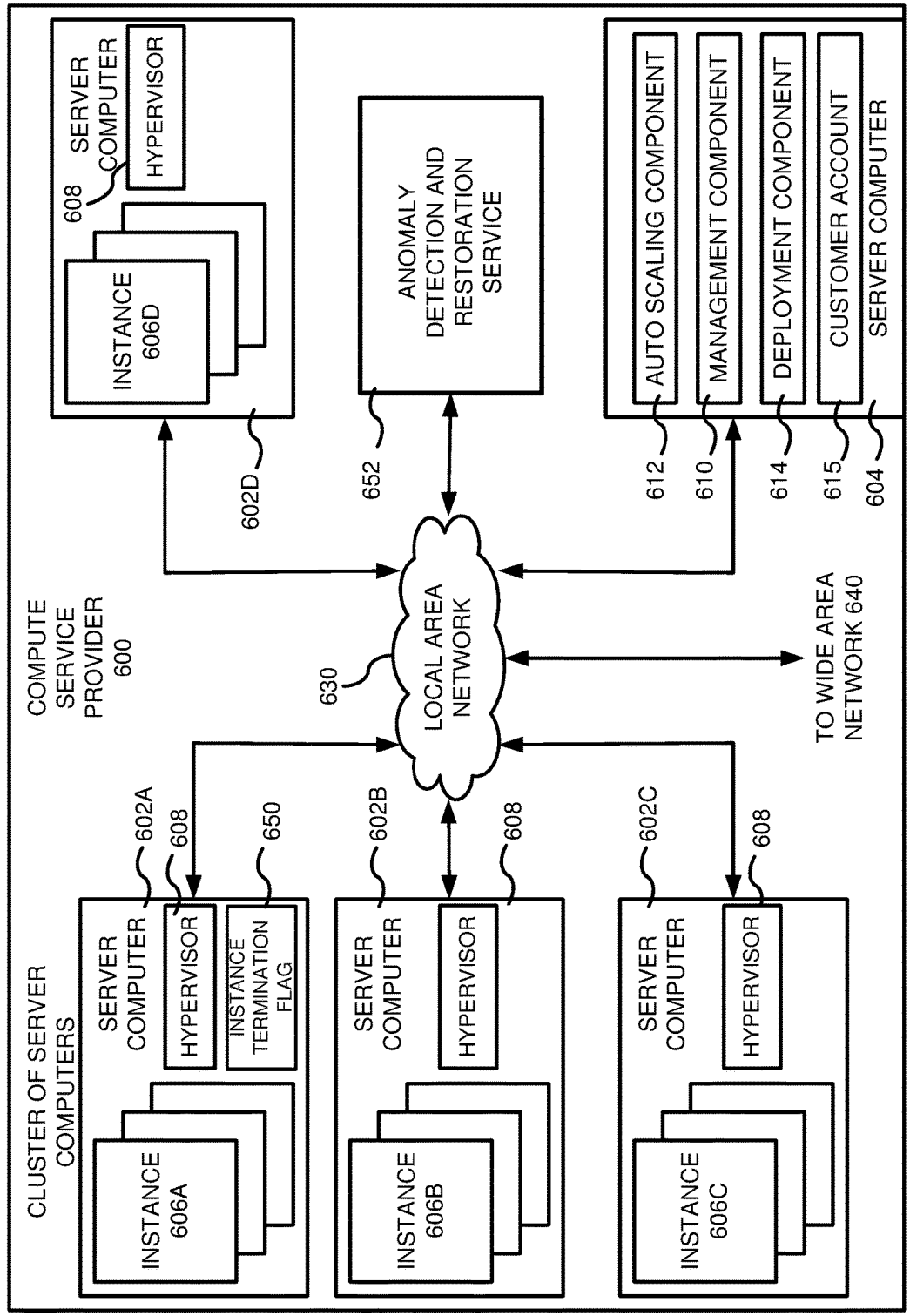
FIG. 6 is an example system diagram showing a plurality of virtual machine instances running in the multi-tenant environment with a marker for placing an instance in an intermediate state of termination.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e.

a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances. Services associated with the compute service provider 600 can execute in the compute service provider environment and can be available to client device (e.g., 112 of FIG. 1) or to virtual machines 606 being used by customers of the compute service provider 600.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

FIG. 6 shows an additional feature wherein instead of data being deleted, as was the case in FIG. 1, an instance 606A is requested to be terminated by a customer. In such a case, an instance termination flag 650 can be set wherein the instance is in an intermediate state in which customers cannot access it, but it is not yet terminated. Thus, with the flag 650 set, customer requests to access the instance 606A are rejected by the hypervisor 608. Nonetheless, the instance 606A still is executing and has access to resources of the server computer 602A. An anomaly detection and restoration service 652 can detect anomalies, such as the deletion of the instance 606A and can alert the customer. If the customer confirms the termination of the instance 606A, then the anomaly detection and restoration service 652 can instruct the hypervisor 608 to terminate the instance 606A and clear the flag 650. Otherwise, if the customer indicates that the termination was in error, then the hypervisor 608 can be instructed to allow the instance 606A to continue executing and the flag 650 will be cleared allowing the customer to interact with the instance. The instance termination flag 650 need not be stored on the server computer 602A and can be in a structure similar to the file allocation table of FIG. 4.

Figure 7:
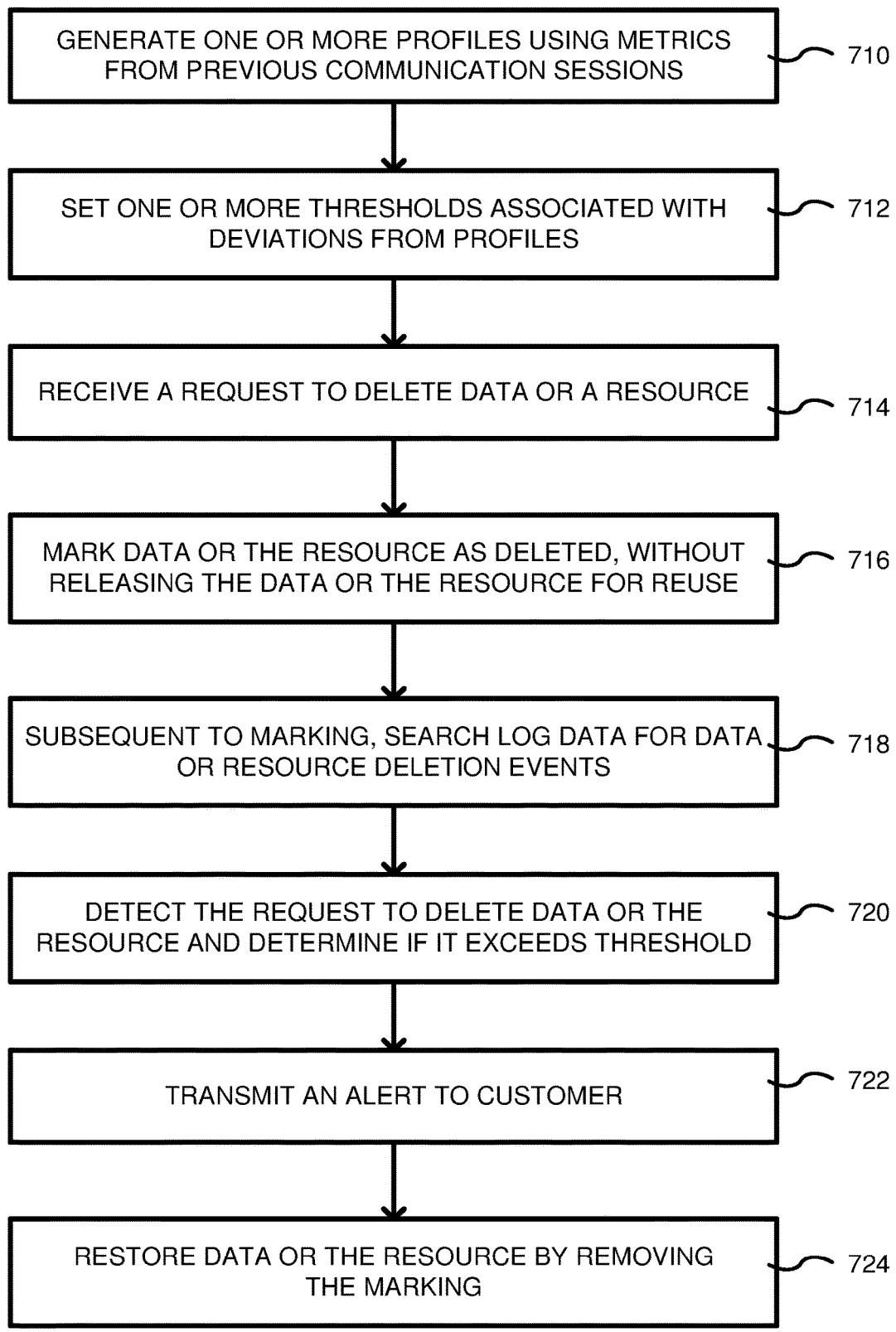
FIG. 7 is a flowchart according to one embodiment for detecting corruption of a resource and restoring the resource to its previous state.

FIG. 7 is a flowchart according to one embodiment for detecting corruption of a resource in a compute service provider environment. In process block 710, one or more profiles can be generated using metrics from previous communications sessions. For example, over a period of time, the customer has a multitude of communications sessions with the compute service provider. Such communications sessions can create a repository of metrics from which a profiling service can generate profiles from log data. As previously explained, the profiles can be associated with Internet addresses used by the client device, geographic locations associated with the client device, services used by the client device within the compute service provider environment, etc. In process block 712, one or more thresholds are set or established which are associated with deviations from the profiles. In one example, the thresholds can be a +/−percentage from an average of a profile. Such thresholds can be input from the customer or an administrator of the compute service provider. In process block 714, a request is received to delete data or a resource. For example, returning to FIG. 1, the client device 112 can request a service 110 to delete data or resource 180. In response, the service 110 can set the flag 182 or otherwise mark the data or resource as deleted (process block 716) but without releasing the data or resource for reuse by others. Thus, the data or resource is in a temporary state where it is not deleted and it is not accessible by the client device 112. Such an intermediate state can be implemented using the new field (see 412, FIG. 4) within a file allocation table. Other techniques for implementing the intermediate state can be used. In process block 718, subsequent to the marking of the deleted data or resource, the anomaly detection and restoration service can search log data for events including the data or resource deletion. Such a search can occur any desired time duration after the deletion request. In process block 720, the anomaly detection and restoration service detects the request to delete the data or resource within the log data and transmits a request to the profiling service to determine if the request was anomalous. Such a request to the profiling service can include the event together with other information such as a time stamp of when the event occurred. In response the profiling service can map the event onto the profiles to determine whether the event exceeds the thresholds set by the profiling service. If the thresholds are exceeded, then in process block 722, the anomaly detection and restoration service 186 transmits an alert to the customer of the compute service provider. At process block 724, assuming the customer requests restoration of the data or resource, the anomaly detection and restoration service clears the marking so that the data or resource is restored to full use by the client device without any loss of data. Of course, if the customer confirms that the data or resource is to be deleted then the anomaly detection and restoration service can instruct the service to fully delete the data or resource so that it is no longer usable and such storage will be reused for other purposes. Fully deleting the data or resource can occur by setting the deleted flag 414, for example.

Figure 8:
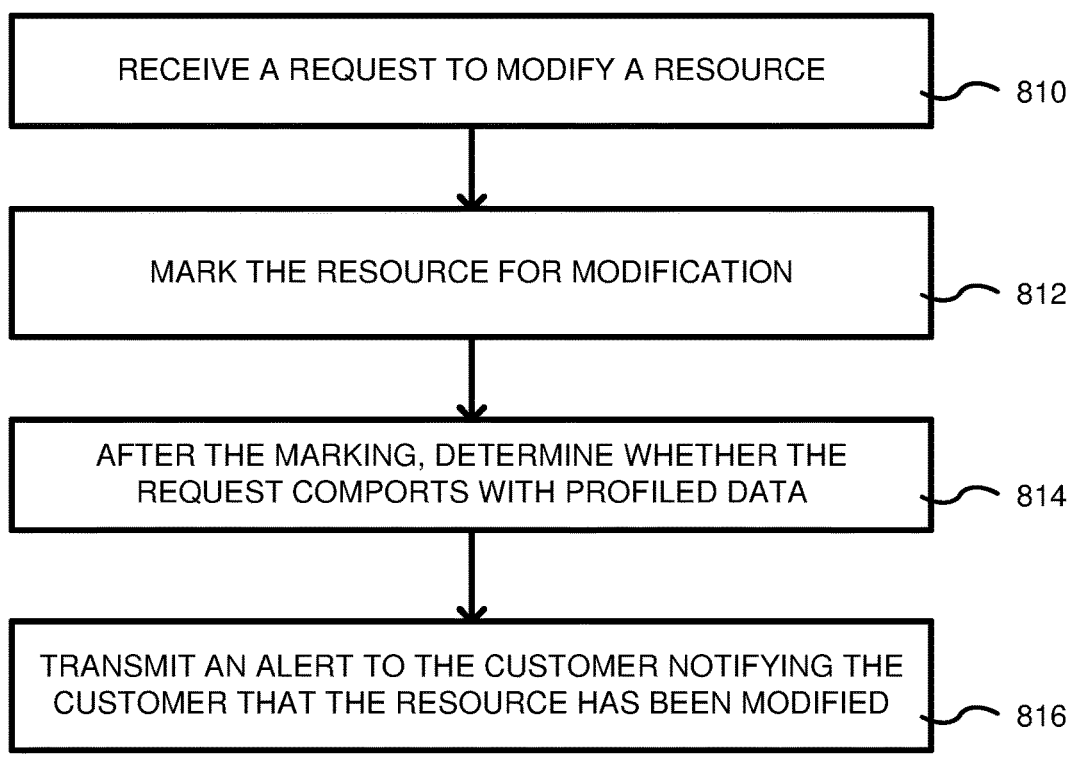
FIG. 8 is a flowchart according to another embodiment for detecting corruption of a resource and transmitting on alert to a customer indicating the corruption.

FIG. 8 is a flowchart according to another embodiment for detecting corruption of a resource in a compute service provider environment. In process block 810, a request is received to modify a resource. The modification can be, for example, deletion of data or termination of an instance. Other actions considered to be modifications can be listed in a list of sensitive actions (see 172 in FIG. 1). In process block 812, the resource is marked for modification. Such a marking can be accomplished through a flag indicating that the resource is in an intermediate state awaiting the modification to occur. The flag can be located within a file allocation table or on a server computer wherein the resource is located. Other flag locations can be used. In process block 814, after the marking has occurred, a determination can be made whether the request comports with profiled data. Such a determination can be made any time after the event is marked so that it appears to the customer that the event was processed instantaneously, but in reality, the event is held in an intermediate state pending final approval. The determination is made by comparing the event to thresholds associated with the profiled data to see if the event exceeds the thresholds. If so, then an anomaly occurred with the event. In process block 816, an alert can be transmitted to the customer to notify the customer that the resource has been modified. As described above, the customer can take action based on the alert to restore the resource to its previous state or the customer can choose to do nothing and allow the modification to occur. For example, if the customer elects to affirmatively request that the resource be restored, then the compute service provider will restore the resource. In the case where the customer does not respond, the compute service provider will reach a time-out period which will be considered to be an affirmation of the modification. Thus, the customer can be allowed to approve or deny the modification.

Figure 9:
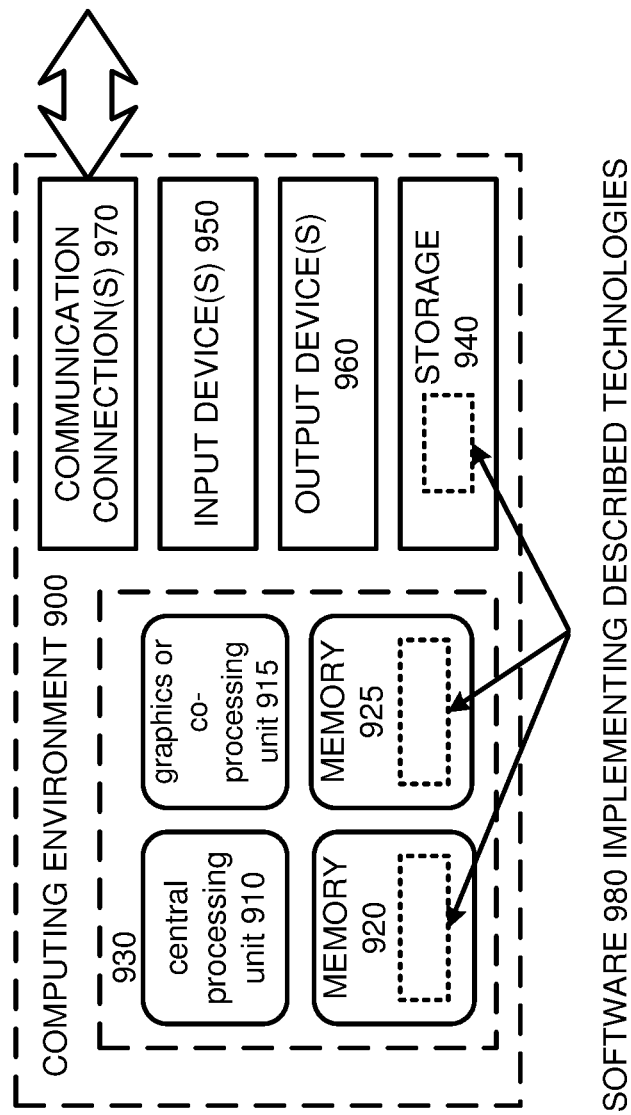
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of detecting corruption of a resource in a compute service provider environment, the method comprising:
    generating one or more profiles including resource profiles or user profiles;
    setting one or more thresholds representing an acceptable deviation from the one or more profiles;
    receiving a request to delete data within the compute service provider;
    marking the data as deleted, without releasing the data for reuse, but rejecting requests for access to the data so that it appears to a customer as though the data is deleted, wherein the data is associated with a resource in the compute service provider environment and the marking of the data results in the resource being unavailable to the customer to access and being unavailable for reuse within the compute service provider environment;
    searching through log data for requests to delete data;
    detecting the request to delete the data and determining whether the request exceeds the one or more thresholds associated with the profiles;
    transmitting an alert to the customer informing the customer of the request to delete the data; and
    restoring the data at the customer's request by removing the marking.

2. The method of claim 1, wherein the user profiles are associated with metrics for previous communication sessions including one or more of the following:
    Application Program Interfaces used by the customer; services that the customer frequently accesses; or a location from which the request was generated.

3. The method of claim 1, wherein marking the data as deleted includes setting a flag indicating that the data is in an intermediate state wherein the data is not yet deleted, but is not accessible.

4. The method of claim 1, wherein the resource profiles include one or more of the following: typical locations of users, typical patterns for using the resource, numbers of users accessing the resource, and typical Application Program Interface requests received by the resource.

5. A method of detecting corruption of a resource in a compute service provider environment, comprising:
    receiving a request, from a client device, to modify a resource within the compute service provider environment;
    in response to the request, marking the resource for modification without performing the modification, wherein the marking of the resource results in the resource being unavailable to a customer to access, but not released for reuse within the compute service provider;

determining that the request does not comport with profiled data associated with the customer; transmitting, based at least in part on the determining, an alert to the customer notifying the customer that the resource has been modified; and allowing the customer to approve or deny the modification.

6. The method of claim 5, wherein the request to modify the resource includes a request to delete the resource.

7. The method of claim 6, wherein the resource is data stored on a server computer.

8. The method of claim 5, wherein the resource is a virtual machine instance executing on a host server computer.

9. The method of claim 5, further including:

generating one or more user profiles using metrics from previous communication sessions between the customer and a compute service provider;

generating one or more resource profiles associated with resources of the compute service provider;

setting one or more thresholds representing an acceptable deviation from the one or more user and resource profiles; and wherein the determining that the request does not comport with profiled data includes comparing the request to the one or more thresholds.

10. The method of claim 9, wherein the metrics include one or more of the following: an Internet address associated with the client device, a geographic location of the client device, a time when the request occurred, or services of the compute service provider with which communications occurred with the client device.

11. The method of claim 5, further including waiting a period of time after transmitting the alert and performing the modification.

12. The method of claim 11, wherein performing the modification includes deleting the resource and releasing the resource to the compute service provider for reuse.

13. The method of claim 5, wherein the request is one of a batch of requests indicative of anomalous behavior.

14. The method of claim 5, further including parsing log data after the marking and obtaining the modification event from the log data.

15. The method of claim 5, further including receiving a request from the customer to undue the modification and removing the marking so that the modification does not occur.

16. A system for detecting corruption of a resource, comprising:

a log service for storing metrics associated with resource behavior and behavior for communication sessions between clients and a service provider;

a profiling service coupled to the log service for generating a user profile or a resource profile based on the metrics; and an anomaly detection and restoration service, the anomaly detection and restoration service for detecting a deletion of a resource by the client device, for marking the resource to indicate that the resource is unavailable to a user, but not released for reuse in the system and for requesting from the profiling service whether the deletion is an anomaly such that there is a deviation in the metrics that exceeds a threshold amount, wherein the anomaly and detection service allows for restoring the deleted resource in the case of an anomaly.

17. The system of claim 16, wherein the anomaly detection and restoration service is configured to transmit an alert to the client device to query whether the deletion was intentional.

18. The system of claim 16, wherein the resource is in a multi-tenant environment.

19. The system of claim 16, wherein the metrics include geographical location of clients accessing the content service provider.

* * * * *

UNITED STATES PATENT AND TRADEMARK OFFICE
CERTIFICATE OF CORRECTION

| | | |
|---|---|---|
| PATENT NO. | : 10,397,236 B1 | |
| APPLICATION NO. | : 15/376335 | |
| DATED | : August 27, 2019 | |
| INVENTOR(S) | : Chadha et al. | |

It is certified that error appears in the above-identified patent and that said Letters Patent is hereby corrected as shown below:

On the Title Page

Item (54) and in the Specification, Column 1,
Line 1, "ANAMOLY" should be --ANOMOLY--.

In the Claims

Column 16,
Line 7, "undue" should be --undo--.

Signed and Sealed this
Fourteenth Day of February, 2023

Katherine Kelly Vidal
*Director of the United States Patent and Trademark Office*